May 29, 1962 A. M. BOCK 3,036,856
VEHICLE FRAME CONSTRUCTION
Filed Jan. 25, 1960 3 Sheets-Sheet 1

INVENTOR.
AUGUST M. BOCK
BY *M. A. Hobbs*
ATTORNEY

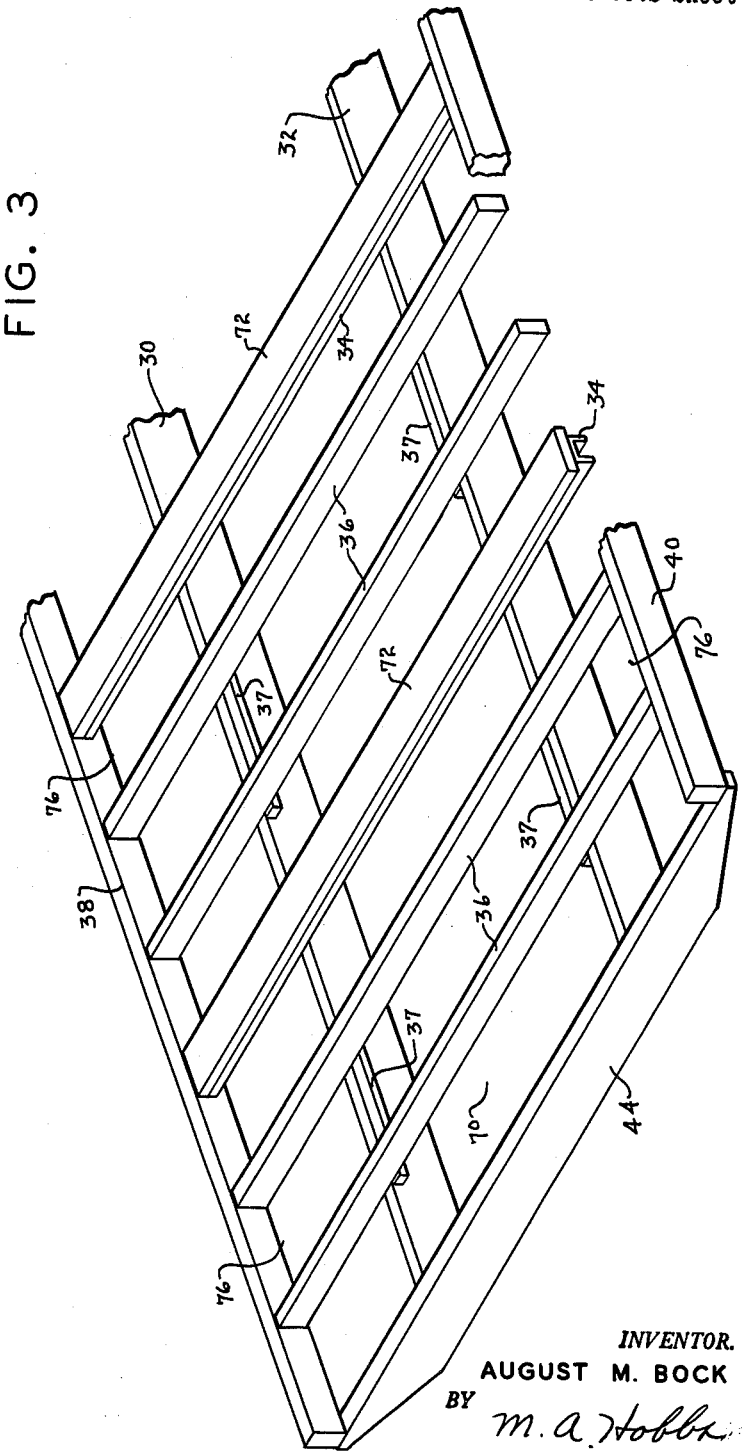

May 29, 1962  A. M. BOCK  3,036,856
VEHICLE FRAME CONSTRUCTION
Filed Jan. 25, 1960  3 Sheets-Sheet 3
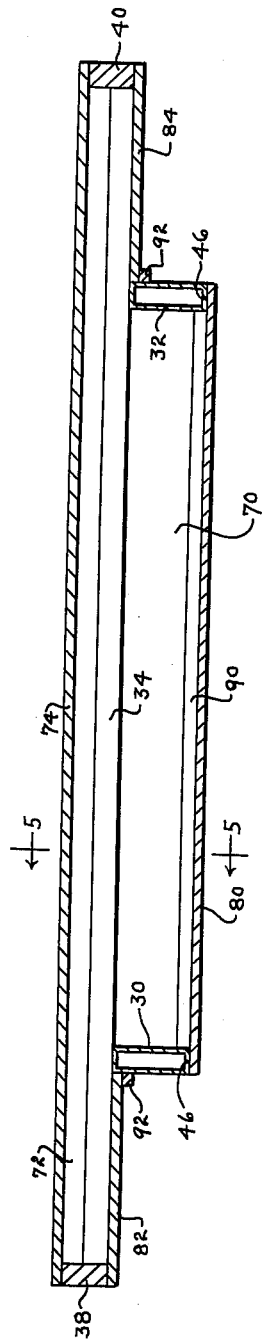
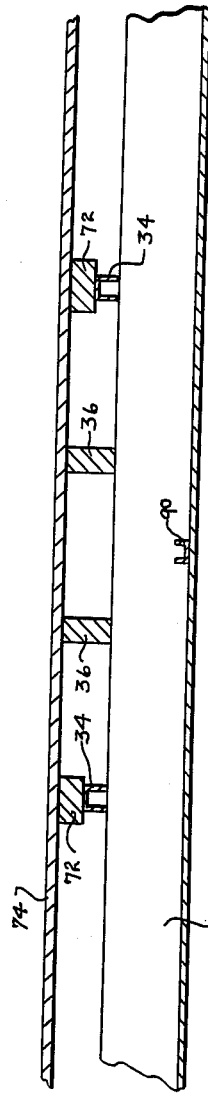
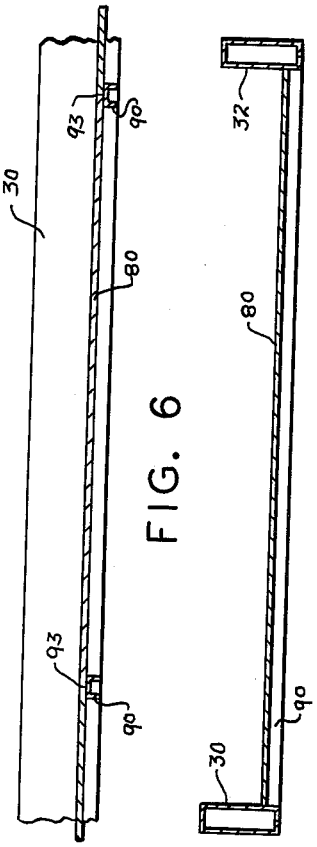
INVENTOR.
AUGUST M. BOCK
BY M. A. Hobbs
ATTORNEY United States Patent Office 3,036,856
Patented May 29, 1962

3,036,856
VEHICLE FRAME CONSTRUCTION
August M. Bock, Elkhart, Ind., assignor to Bock Industries of Elkhart, Indiana, Inc., Elkhart, Ind., a corporation of Indiana
Filed Jan. 25, 1960, Ser. No. 4,549
6 Claims. (Cl. 296—28)

The present invention relates to vehicle frames and more particularly to a frame and floor construction for trailers, mobile homes and similar vehicles.

In mobile homes having a centralized heating system, the furnace or other type of hot air heating unit is located in the enclosed space on or above the floor and is frequently connected to remote areas in the living space by hot air ducts passing downwardly into the floor and thence through and between the joists to registers in the floor spaced at various intervals from the unit to each end of the vehicle. This type of system is difficult to install and maintain in the modern mobile home having the conventional frame and floor construction in that large notches must be cut into the joists, resulting in substantial weakening of the structure, and the hot air ducts must be placed under the floor where the heat therefrom causes cracks and other defects in the flooring. This construction has been necessary in conventional frames in which the cross members connecting the longitudinal members are disposed between the longitudinal members, filling substantially the entire vertical space therebetween and leaving no continuous passageways in which the hot air ducts could be placed. To provide special openings through the cross members or to provide specially designed cross members so the ducts could be installed without interference from the cross members would increase the cost of the frame and floor construction and create difficult installations requiring considerable time and expense to complete. It is therefore one of the principal objects of the present invention to provide a relatively simple and rugged frame and floor construction for mobile homes, trailers and the like which provides one or more broad areas extending substantially the full length of the vehicle for receiving the hot air ducts of a heating system and serving as the cold air return duct.

Another object of the invention is to provide a frame and floor construction for mobile homes, trailers and similar vehicles having two main longitudinal frame members and a plurality of cross members of steel construction secured to the upper side of the longitudinal members for giving the required strength and sturdiness and a plurality of wood cross members for securing the floor to the steel frame construction.

Still another object of the invention is to provide a frame and floor construction of the aforesaid type in which the space between the longitudinal members is unobstructed throughout substantially the full length of the vehicle.

A further object is to provide a frame and floor construction which can readily be enclosed by suitable sheeting or paneling on the underside of the frame to protect the structural members and to insulate the vehicle floor and any air ducts enclosed within the floor supporting structure.

Another object of the invention is to provide a frame construction for the floor of mobile homes, trailers and similar vehicles, which can be easily fabricated and incorporated into the vehicle and which does not require any intricately designed structural parts or members.

Another object of the invention is to provide a frame and floor structure for trailers and mobile homes which can be made any desired width and which can be varied in length over a wide range without changing the basic construction and design.

Additional objects and advantages of the present invention will become apparent from the following description and accompanying drawings, wherein:

FIGURE 3 is a section of the frame shown in perspective with a portion of the side frame broken away to better show the frame construction and before the flooring has been installed thereon;

FIGURE 4 is a vertical cross sectional view of the frame and floor construction taken on line 4—4 of FIGURE 1.

FIGURE 5 is a fragmentary vertical cross sectional view of the frame and floor construction taken on line 5—5 of FIGURE 4; and FIGURES 6 and 7 are fragmentary vertical transverse and longitudinal cross sectional views, respectively, of a modified form of my frame and floor construction.

Figure 1:
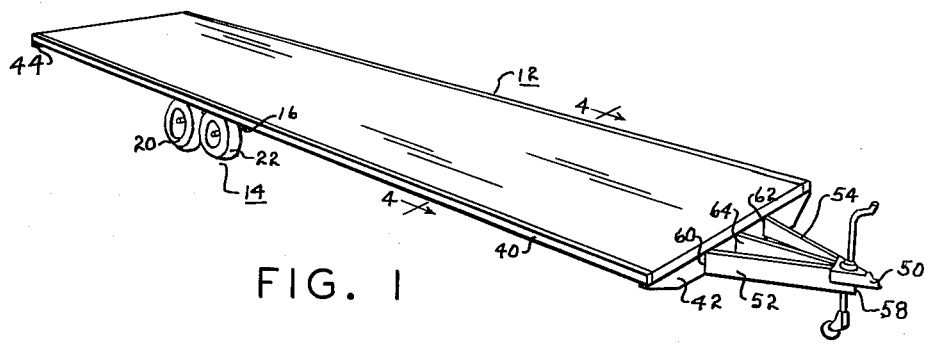
FIGURE 1 is a perspective view of my frame mounted on a tandem undercarriage and ready to receive the body of a mobile home or trailer.
Figure 2:
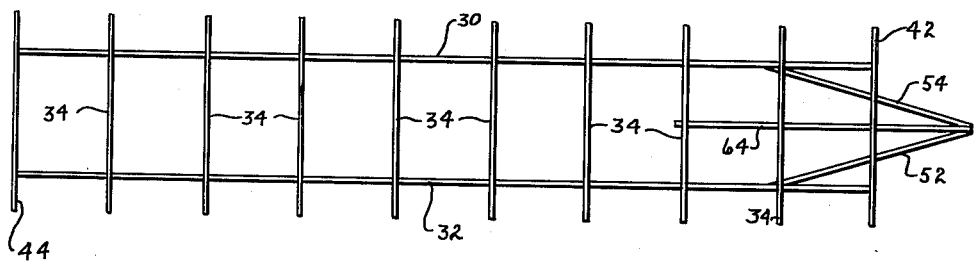
FIGURE 2 is a top plan view of the present frame incorporated in the frame and floor construction of FIGURE 1.

Referring more specifically to the drawings and to FIGURE 1 in particular, numeral 12 indicates generally my frame and floor construction for mobile homes, trailers and similar vehicles, shown mounted on a tandem axle undercarriage 14, including axles 16 and wheels 20 and 22 on one side and similar dual wheels on the opposite side mounted on the two axles. The frame is supported on the axles by a plurality of springs (not shown) attached to the axles near the wheel and to the underside of the frame. The frame may be mounted on a one, two or three axle undercarriage, depending upon the size and weight of the body to be carried thereby.

The present frame and floor construction consists of two steel longitudinal members 30 and 32 extending substantially the full length of the frame, and a plurality of steel cross members 34 spaced along the length of the frame and resting on and secured to the upper edge of the longitudinal members 30 and 32. Interposed between steel cross members 34 are a plurality of wood cross members 36 resting directly on the upper edge of the longitudinal members. The sets of cross members 36 between steel cross members 34 may be connected by battens 37 secured to the under side of said members and, if desired, to the upper portion of members 30 and 32. While two wood cross members are shown between each pair of steel cross members, one or three or more may be used if desired. The steel and wood cross members are the same length and extend beyond the outside edge of the longitudinal members to the approximate edge of the vehicle floor. Runners or sills 38 and 40 are secured to the ends of the cross members and are flush with the top and bottom of the wood members, the wood members being, in the construction shown, standard two-by-four inch timbers, and the steel members, which are inverted channel iron, are approximately two-by-two inches in cross section. The forward and rear ends of longitudinal members 30 and 32 are joined by end members 42 and 44 which are secured rigidly thereto by welding.

The longitudinal members 30 and 32 are preferably formed of sheet steel into a tube of rectangular cross section and welded along a seam 46, shown located in the bottom side of the member. These tubular longitudinal members will vary in size from one vehicle structure to another; however, they would normally measure approximately two inches in the lateral direction and from three inches to about eight inches in the vertical direction. The frame includes a means for mounting a hitch 50 on the trailer or mobile home in order to couple the vehicle to a towing vehicle, consisting of diagonal members 52 and 54 extending from the longitudinal members near the front thereof to a point at the front and center of the frame. Members 52 and 54 are welded to their respective longitudinal members, pass through end member 42 and are joined together at numeral 58 by welding, cross member 42 being provided with holes 60 and 62 through which members 52 and 54 are slipped during the assembly operation. In the longer frames it may be desirable to reinforce the front section by the use of a longitudinal rib 64 extending from the joint between members 52 and 54 rearwardly at the center through cross member 42 and along the underside of several of the forwardmost cross members 34, the rib preferably being joined to the steel cross members by welding.

One of the important features of the present invention is the provision of the completely unobstructed space 70 between the longitudinal members 30 and 32 without sacrificing strength and rigidity of the frame and without increasing the overall height of the frame and floor construction above the conventional frame and floor construction having the cross members disposed between the longitudinal members. The present construction utilizes the spaced steel cross members 34 which are joined securely by welding to the longitudinal members and which are substantially less in height than the height of the wood members 36. A wood member 72 is placed on top of and bolted to steel members 34, the thickness of the wood members being such that the height of the compound steel member 34 and wood member 72 corresponds to the height of the wood members 36 to provide a series of cross members of uniform height for receiving flooring or subflooring 74 of the vehicle. The flooring 74 shown in the drawings is standard three-quarter inch plywood and is normally joined to every one of the cross members 36 and 72 by nails or screws and covers the entire upper surface area of the frame, enclosing the top of space 70 with the exception of openings (not shown) for the hot air ducts and electrical and plumbing connections.

After the air ducts, electrical wiring and plumbing have been installed beneath the floor 74 in the center space 70 and in the side spaces 76 between members 34 and 36, bottom panels 80, 82 and 84 close the aforementioned spaces to protect the structural members of the frame and floor, and the heating, electrical and plumbing equipment installed beneath the floor. These panels normally consist of plywood, pressed wood or the like which have been treated or constructed to withstand water and street chemicals, frequently splashed on their lower surface during road use of the vehicle. The paneling material may be inherently resistant to the water and chemicals or it may be treated on the underside with a rubber or tar base paint or coating after the panels have been installed on the vehicle. Panel 80 is secured by screws or bolts at its edges to the lower edge of longitudinal members 30 and 32, or, if desired, longitudinal wood strips may be secured to the lower portion of members 30 and 32 preferably at the lower inside thereof. Cross strips 90 are preferably used at the seams between the panel sections, these cross strips being either above or below the panels, the one shown being above the panels. Panels 82 and 84 are joined at their outside edges to the underside of sills 38 and 40, respectively, and in trannsverse intervals to the underside of members 36. To give support to the inner edge of panels 82 and 84, a strip 92 is placed beneath the edge and joined by nails or screws through the panels to cross members 34. These strips may also be joined to the side of longitudinal members 30 and 32 in order to form a tighter joint between the panels and said members.

In fabricating the present frame and floor construction, the steel members including members 30, 32, and 34 are cut to length, assembled and joined together by welding, and then the wood members 36 and sills 38 and 40 are secured to the assembled steel members. Flooring 74 and panels 80, 82 and 84 are secured to the wood members and sills in intermediate or final stages in the construction of the vehicle. The foregoing frame and floor construction lends itself to a large variety of types of mobile homes and trailer bodies of different sizes and designs.

The modified form of the invention disclosed in FIGURES 6 and 7 includes placing the panels 80 on top of cross strips 90 with the joints 93 between the panels being directly above the cross strips. This construction forms a sturdy structure and permits the panels to be secured in place without inverting the frame or elevating it sufficiently to allow workmen to work beneath the frame as well as providing ample space for hot air ducts. Sealing strips (not shown) may be secured to the edges of the panels and to the internal sides of the longitudinal members 30 and 32.

While only two forms of my frame and floor construction have been described in detail herein, various changes and modifications may be made without departing from the scope of the invention.

I claim:

1. A frame and floor construction for trailers, mobile homes and similar vehicles, comprising two longitudinal and parallel steel tubular members of rectangular cross section, end members joined to the forward and rear ends of said longitudinal members, a plurality of equally spaced inverted channel iron cross members extending transversely between said longitudinal members, said cross members being joined by welding to said longitudinal members on the upper edge thereof and projecting outwardly from said longitudinal members to the approximate respective edge of the vehicle, a central rib extending longitudinally between and forwardly beyond said longitudinal members, two diagonal members connected to the forward end of said rib and extending through said forward end member to said longitudinal members, a plurality of wood cross members mounted on the upper side of said longitudinal members between said steel cross members and projecting outwardly from said longitudinal members to the approximate respective edge of the vehicle, said wood members being of greater height than said steel members, wood cross members secured to and extending longitudinally with the upper side of said steel cross members and being of such thickness that the combined height of the steel and wood cross members attached thereto equals the height of the first mentioned wood cross members, sills secured to the ends of the cross members, flooring mounted on and secured to said cross members, panel means extending between and being secured to the underside of said longitudinal members, and panel means mounted on the underside of said sills and cross members on the underside of the portion thereof projecting outwardly beyond said longitudinal members.

2. A frame and floor construction for trailers, mobile homes and similar vehicles, comprising two longitudinal and parallel steel tubular members of rectangular cross section, end members joined to the forward and rear ends of said longitudinal members, a plurality of equally spaced inverted channel iron cross members extending transversely between said longitudinal members, said cross members being joined by welding to said longitudinal members on the upper edge thereof and projecting outwardly from said longitudinal members to the approximate respective edge of the vehicle, a plurality of wood cross members mounted on and extending longitudinally with the upper side of said longitudinal members between said steel cross members and projecting outwardly from said longitudinal members to the approximate respective edge of the vehicle, said wood members being of greater height than said steel members, wood cross members secured to the upper side of said steel cross members and being of such thickness that the combined height of the steel and wood cross members attached thereto equals the height of the wood cross members, sills secured to the ends of the cross members, flooring mounted on and secured to said cross members, panel means extending between and being secured to the underside of said longitudinal members, and panel means mounted on the underside of said sills and cross members on the underside of the portion thereof projecting outwardly beyond said longitudinal members.

3. A frame and floor construction for trailers, mobile homes and similar vehicles, comprising two longitudinal steel members of generally rectangular cross section, end members joined to the forward and rear ends of said longitudinal members, a plurality of channel iron cross members extending transversely between said longitudinal members, said cross members being joined to said longitudinal members at the upper edge thereof and projecting outwardly from said longitudinal members to the approximate respective edge of the vehicle, a plurality of wood cross members mounted on and extending longitudinally with the upper side of said longitudinal members between said steel cross members and projecting outwardly from said longitudinal members to the approximate respective edge of the vehicle, said wood members being of greater height than said steel members, wood cross members secured to the upper side of said steel cross members and being of such thickness that the combined height of the steel and wood cross members attached thereto equals the height of the wood cross members, sills secured to the ends of the cross members, flooring mounted on and secured to said cross members, panel means extending between and being secured to the underside of said longitudinal members, and panel means mounted on the underside of said cross members outwardly beyond said longitudinal members.

4. A frame and floor construction for trailers, mobile homes and similar vehicles, comprising two longitudinal steel members, end members joined to the forward and rear ends of said longitudinal members, a plurality of steel cross members extending transversely between said longitudinal members, said cross members being joined to said longitudinal members at the upper edge thereof and projecting outwardly from said longitudinal members, a plurality of wood cross members mounted on the upper side of said longitudinal members between said steel cross members and projecting outwardly from said longitudinal members to the approximate respective edge of the vehicle, said wood members being of greater height than said steel members, wood cross members secured to and extending longitudinally with the upper side of said steel cross members and being of such thickness that the combined height of the steel and wood cross members attached thereto equals the height of the wood cross members, flooring mounted on and secured to said cross members, panel means extending between and being secured to the underside of said longitudinal members, and panel means mounted on the underside of said cross members outwardly beyond said longitudinal members.

5. A frame and floor construction for trailers, mobile homes and similar vehicles, comprising two longitudinal steel members, steel cross members extending transversely between said longitudinal members, said cross members being joined to said longitudinal members at the upper edge thereof and projecting outwardly from said longitudinal members, wood cross members mounted on and extending longitudinally with the upper side of said longitudinal members between said steel cross members and projecting outwardly from said longitudinal members to the approximate respective edge of the vehicle, said wood members being of greater height than said steel members, wood cross members secured to the upper side of said steel cross members and being of such thickness that the combined height of the steel and wood cross members attached thereto equals the height of the wood cross members, flooring mounted on and secured to said cross members, panel means extending between and being secured to the underside of said longitudinal members, and panel means mounted on the underside of said cross members outwardly beyond said longitudinal members.

6. A frame and floor construction for trailers, mobile homes and similar vehicles, comprising two longitudinal steel members, steel cross members extending transversely across said longitudinal members, said cross members being joined to said longitudinal members at the upper edge thereof, wood cross members mounted on the upper side of said longitudinal members between said steel cross members and projecting outwardly from said longitudinal members to the approximate respective edge of the vehicle, said wood members being of greater height than said steel members, wood cross members secured to and extending longitudinally with the upper side of said steel cross members and being of such thickness that the combined height of the steel and wood cross members attached thereto equals the height of the wood cross members, flooring mounted on and secured to said cross members, and panel means extending between and being secured to the underside of said longitudinal members.

References Cited in the file of this patent

UNITED STATES PATENTS

| | | |
|---|---|---|
| 1,127,130 | Wartzack | Feb. 2, 1915 |
| 2,082,163 | Jeoffroy | June 1, 1937 |
| 2,138,399 | Davis | Nov. 29, 1938 |
| 2,494,115 | Bock | Jan. 10, 1950 |
| 2,717,802 | Martin | Sept. 13, 1955 |
| 2,841,415 | Black | July 1, 1958 |
| 2,851,281 | Felburn | Sept. 9, 1958 |

FOREIGN PATENTS

| | | |
|---|---|---|
| 858,065 | Germany | Dec. 4, 1952 |